B. D. Beecher.
Swaging Screws.
Nº 77,710.   Patented May 12, 1868.
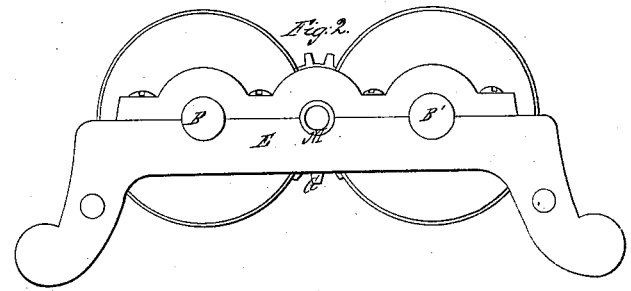
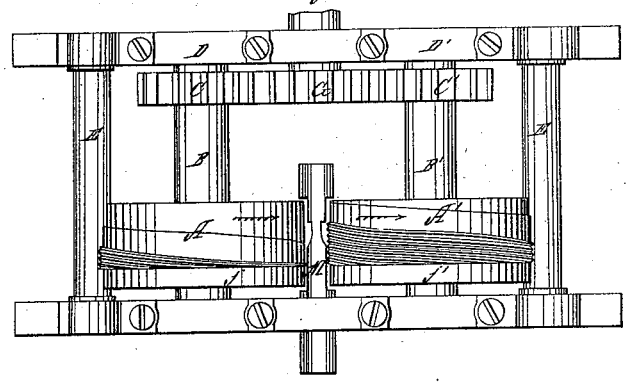
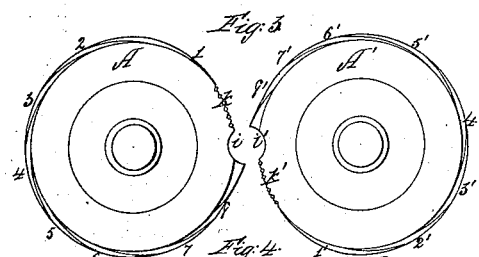
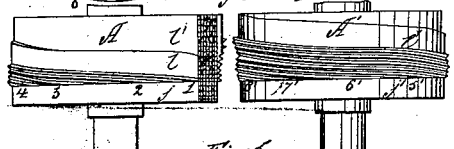
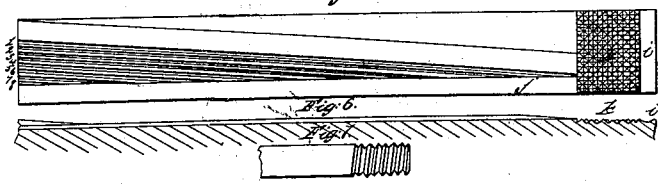
Witnesses:   Inventor:
Amos Shepard   Benj. D. Beecher
Henry M. Beecher

United States Patent Office.

BENJAMIN D. BEECHER, OF PLANTSVILLE, CONNECTICUT, ASSIGNOR TO LUTHER BEECHER.

*Letters Patent No. 77,710, dated May 12, 1868.*

IMPROVED MACHINE FOR THREADING BOLTS.

The Schedule referred to in these Letters Patent and making part of the same.

TO ALL WHOM IT MAY CONCERN:

Be it known that I, BENJAMIN D. BEECHER, of Plantsville, in the county of Hartford, and State of Connecticut, have invented a new and useful Improvement in Dies for Making Screw-Threads upon Metal Bolts by means of pressure and motion; and I do hereby declare that the following is a full, clear, and exact description thereof, reference being had to the accompanying drawings, and to the figures and letters marked thereon, and in which—

Figure 1 is a top view of the dies, and their bearings and connections, when formed upon the periphery of revolving disks or rolls.

Figure 2 is an end elevation of the same.

Figure 3 is an end elevation of the dies, with the bearings and connections removed.

Figure 4 is a top view of the dies.

Figure 5 represents the whole surface of a rotary die, as it would appear if developed on a plane.

Figure 6 is a profile of the same.

Figure 7 represents a section, through its axis, of a screw produced by this mode of action, showing the direction given to the fibres of the metal by the operation of the dies.

In all the figures, the same parts are indicated by the same letters of reference.

My invention consists in an improved arrangement of the threads upon the surface of the dies, and in forming a plain or smooth portion in such surface, between the first thread of the series and the edge of the die; also in forming a portion of the surface, across the die, with small ridges or projections, so as to crack off and remove the scale from the heated bar or blank, preparatory to its being passed through the dies.

The cylindrical die A or A', (both being alike,) is made of steel, upon an iron disk or body, and should be properly tempered, and must be of sufficient diameter to embrace, in about two-thirds of its perimeter, the whole length of the helix of the proposed screw.

Across the face of the die is cut a groove or recess, $i$, which groove or recess should be made a little deeper than the space between the threads of the screw.

Upon one side of this groove or recess $i$, for the full width of the die, and for a distance which shall be equal at least to the circumference of the blank bolt upon which the screw is to be formed, the surface is hatched or embossed, as shown at $k$ $k'$, so as to act upon the surface of the heated blank in such wise as to crack off and remove the scale while starting the blank bolt into motion around its own axis.

Adjoining this embossed portion of the die is a series of raised helical threads, numbered, respectively, 1, 2, 3, &c., having the same angle or rake which the thread of the proposed screw will form upon the bolt. The first of these threads, marked 1 in the drawing, commences at the embossed surface $k$, opposite the groove $i$, and continues in a true helical direction, and with the proper angle, around the periphery of the die, till it meets the groove $i$ on the opposite side of the embossed surface $k$. The next thread, 2, will have the same distance from the first thread which the threads upon the proposed screw will have, and so on with all the remaining threads of the series; that is to say, the threads of the dies will have the same pitch which the thread of the proposed screw is to have upon the bolt. All the threads of the dies, after the first one, will run out at the edge of the die, in their consecutive order, thus gradually shortening from the first to the last of the series.

Between the first thread and the opposite side of the die, there is a blank space, J, which is a continuation of the surface upon which the threads of the die are raised. This portion of the die acts upon the blank part of the bolt upon which the screw is being formed, by assisting to rotate the bolt, and by bringing it into a truly cylindrical form. The shape of the threads in the dies must correspond, reversely, with the threads of the proposed screw.

The dies being thus formed, arranged, and constructed, are mounted on substantial spindles and bearings, so as to prevent springing and tremor, and are geared together by means of equal wheels, so as to secure the constant return to each other of the corresponding points in both the dies.

These spindles are arranged parallel with each other, and at such distance apart as will enable the threads upon the dies to penetrate the blank bolt to their full depth on both its opposite sides; and that this shall be done with the necessary exactness, the bearings of the spindles, or of one of them, should be so constructed as to be set closer to or further from each other, as may be required; and they should also be made adjustable endwise, so as to secure the exact coaptation of the threads.

The machine, thus constructed, and geared, is set in motion at a proper speed, by power from any first mover. A heated blank is then inserted in the socket or guide M, between the two dies A A', at the groove $i$. This being done, the embossed portions $k\ k'$ of the dies, immediately act upon the surface of the blank bolt, causing it to rotate upon its own axis within the socket M, and at the same time cracking off and removing the scale which has been formed upon the blank by the heating process.

The embossed portion of the dies having passed over the circumference of the blank bolt, the thread 1 strikes into the substance of the revolving blank, to its full depth, and the blank having completed a revolution upon its axis, thread 2 strikes into the crease or helical groove made by thread 1. A second revolution of the blank being completed, thread 3 strikes into the groove just left by thread 2, thread 2 again entering and following into the groove left by thread 1, and so on, for any number of threads. The first thread of the series may be considered as roughing out the helical crease or groove between the threads upon the bolt, and the succeeding threads as finishing such threads and spaces; but at the same time they perform the important function of preserving the true form of the thread upon the bolt, for the action of a single thread upon each of the dies would be to spread the metal of the blank, which has been displaced from the crease or groove formed by it, to both its sides, but this is effectually prevented by the succeeding threads of the dies, their conjoint action being to force the displaced metal to one side only of the first thread, that is, towards the point of the blank, the consequence of which is, that the metal thus displaced from between the threads is worked into the substance of the bolt, thus utilizing the material by increasing the length of the screw.

Having thus described the nature and construction of my improved screw-forming dies, and shown one of the modes in which they may be applied to the production of a useful effect, what I claim therein as my own invention, and desire to secure by Letters Patent, is—

1. Arranging the cutting-threads on the surface of the dies, as herein described, that is to say, so that a portion of each of said die-surfaces shall be left plain, for the purpose of gradually rounding the blank, as the operation of threading it progresses, and that the initial or commencing portions of the several cutting-threads shall follow one another in succession, all substantially as set forth.

2. I claim, in combination with the threaded part of the die, the embossed surface $k\ k'$, substantially as and for the purpose set forth.

BENJ'N D. BEECHER.

Witnesses:
    H. R. BRADLEY,
    HENRY M. BEECHER.